United States Patent
Parameswaran et al.

(10) Patent No.: US 9,418,073 B2
(45) Date of Patent: Aug. 16, 2016

(54) SYSTEM AND METHOD FOR CONVERTING FORMAT OF JOBS ASSOCIATED WITH A JOB STREAM

(71) Applicant: Tata Consultancy Services Limited, Maharashtra (IN)

(72) Inventors: Ramakrishnan Parameswaran, Tamil Nadu (IN); Sampradha Singanaloor Gopalakrishnan, Tamil Nadu (IN)

(73) Assignee: Tata Consultancy Services Limited, Maharashtra (IN)

( * ) Notice: Subject to any disclaimer, the term of this patent is extended or adjusted under 35 U.S.C. 154(b) by 238 days.

(21) Appl. No.: 14/221,382

(22) Filed: Mar. 21, 2014

(65) Prior Publication Data

US 2015/0220541 A1 Aug. 6, 2015

(30) Foreign Application Priority Data

Feb. 6, 2014 (IN) .......................... 435/MUM/2014

(51) Int. Cl.
*G06F 7/00* (2006.01)
*G06F 17/00* (2006.01)
*G06F 17/30* (2006.01)

(52) U.S. Cl.
CPC ................ *G06F 17/30179* (2013.01)

(58) Field of Classification Search
CPC ................ G06F 17/30076; G06F 3/1247
USPC ...................................... 707/694
See application file for complete search history.

(56) References Cited

U.S. PATENT DOCUMENTS

| | | | |
|---|---|---|---|
| 6,629,122 B1 * | 9/2003 | Yotsukura | G06F 8/30 718/101 |
| 7,353,514 B1 | 4/2008 | Camp et al. | |
| 7,757,235 B2 | 7/2010 | Davis et al. | |
| 2004/0130746 A1 * | 7/2004 | Wu | H04N 1/00278 358/1.15 |
| 2006/0017969 A1 | 1/2006 | Ly et al. | |
| 2007/0035763 A1 * | 2/2007 | Bard | G06F 3/1222 358/1.15 |
| 2007/0076228 A1 * | 4/2007 | Apelbaum | G06Q 10/10 358/1.1 |
| 2008/0140675 A1 * | 6/2008 | Saito | G03G 21/04 |
| 2008/0232219 A1 * | 9/2008 | Sharma | G11B 7/28 369/85 |
| 2010/0287540 A1 | 11/2010 | Takai et al. | |
| 2012/0131591 A1 * | 5/2012 | Moorthi | G06Q 30/00 718/104 |

OTHER PUBLICATIONS

BMC, "BMC Control-M Conversion Tool—BMC Software" 2011.

(Continued)

*Primary Examiner* — Binh V Ho
(74) *Attorney, Agent, or Firm* — Hayes Soloway PC

(57) ABSTRACT

System(s) and method(s) converting format of jobs associated with a software job stream are disclosed. A file containing syntax in an original format is received. The syntax defines the jobs and schedules in the original format. At least one keyword associated with the jobs and schedules and definition format of the jobs is identified. At least one mandatory parameter or optional parameter is checked while applying logic rules. The logic rules define mapping conditions with respect to each attribute associated with the mandatory and optional parameters. The keywords and the definition format associated with the job and schedule are mapped to a set of pre-defined keywords and definition format to obtain a set of mapped keywords and mapped definition format. The mapped keywords and mapped definition format are used to convert original syntax into a desired syntax thereby converting original format of the jobs and schedules into the desired format.

20 Claims, 4 Drawing Sheets

(56) References Cited

OTHER PUBLICATIONS

CA Technologies, "CA Workload Automation iXp", Administration Guide: Release 11.3.5, Second Edition, 2012.

ORSYP: Workload Automation 2.0 Value Proposition—ORSYP, "ORSYP: Getting From CA AutoSys onto Dollar Universe" ORSYP 2013 ▪ : ORSYP: Getting from AutoSys to Dollar Universe.
BMC "How to : capture data for Autosys Conversion" 2012.

* cited by examiner

SYSTEM AND METHOD FOR CONVERTING FORMAT OF JOBS ASSOCIATED WITH A JOB STREAM

TECHNICAL FIELD

The present disclosure in general relates to a method and system for converting format of jobs. More particularly, the system and method provides conversion of one format of jobs into another format associated with a job stream in a computing environment.

BACKGROUND

These days, job scheduling has become a major assignment of an operating system. In a computing environment, system resources are allocated to complete various tasks termed as job scheduling or batch processing. Format of defining these job schedules plays a vital role in processing of these jobs. A conversion of one format of a job definition into another format may be required to improve the performance. Conversion of format may also be required to facilitate cross vendor workflow implementations.

The conventional approaches require much amount of manual effort for converting the format of a job schedule into another. Also the manual processes for converting the format of jobs are time consuming and requires large amount of cost.

In order to manually convert the format of job into a desired format, a user should be skilled in both the formats (format to be converted and desired format) in terms of syntactical terms, usage and functionality of various features used to design such a conversion process. The person should have knowledge about production environments which utilizes these schedulers. The person should also be aware of "why, where and how" it is used. The person should also have in depth knowledge about the real-time production scenarios related to these schedulers, the outcomes and issues and the pros and cons to design such a conversion process.

Thus, a heretofore unaddressed need exists in the industry to address the aforementioned deficiencies and inadequacies.

SUMMARY OF THE DISCLOSURE

This summary is provided to introduce aspects related to system(s) and method(s) for converting format of jobs associated with a software job stream (TWS Maestro) and the aspects are further described below in the detailed description. This summary is not intended to identify essential features of the claimed subject matter nor is it intended for use in determining or limiting the scope of the claimed subject matter.

The present disclosure relates to a system for converting a format of jobs associated with a software job stream. The system comprising a processor and a memory coupled to the processor, wherein the processor is capable of executing a plurality of modules stored in the memory. The plurality of modules comprise a receiving module configured to receive a file in an original format, wherein the file is associated with the software job stream, wherein the file comprises at least one syntax defining the jobs and a plurality of schedules. An identification module is configured to identify at least one keyword associated with the jobs and the plurality of schedules along with a definition format of the jobs and the plurality of schedules. A converting module is configured to: check at least one of a mandatory parameter and an optional parameter associated with the at least one keyword of the original format to apply at least one logic rule, wherein the at least one logic rule defines a mapping condition with respect to an attribute of at least one of the mandatory parameter and the optional parameter; map the at least one keyword and the definition format with a set of predefined keywords and a pre-defined definition format by using the at least one logic rule in order to obtain at least one mapped keyword and at least one mapped definition format; and generate a desired syntax in a desired format by using the at least one mapped keyword and the at least one mapped definition format, thereby facilitating conversion of the format of the jobs.

The present disclosure also relates to a method for converting a format of jobs associated with a software job stream. In this regard, one embodiment of such a method, among others, can be broadly summarized by the following steps: receiving a file in an original format, wherein the file is associated with the software job stream, wherein the file comprises at least one syntax defining the jobs and a plurality of schedules; identifying at least one keyword associated to the jobs and the plurality of schedules along with a definition format of the jobs and the plurality of schedules; checking at least one of a mandatory parameter and an optional parameter associated with the at least one keyword of the original format to apply at least one logic rule, wherein the at least one logic rule defines a mapping condition with respect to an attribute of at least one of the mandatory parameter and the optional parameter; mapping the at least one keyword and the definition format with a set of predefined keywords and a pre-defined definition format by using the at least one logic rule in order to obtain at least one mapped keyword and at least one mapped definition format; and generating a desired syntax in a desired format by using the at least one mapped keyword and the at least one mapped definition format, thereby facilitating conversion of the format of the jobs.

The present disclosure also relates to a computer program product having embodied thereon a computer program for changing a format of jobs associated with a software job stream. The computer program product comprises a program code for receiving a file in an original format, wherein the file is associated with the software job stream, wherein the file comprises at least one syntax defining the jobs and a plurality of schedules; a program code for identifying at least one keyword associated to the jobs and the plurality of schedules along with the definition format of the jobs and the plurality of schedules; a program code checking at least one of a mandatory parameter and an optional parameter associated with the at least one keyword of the original format to apply at least one logic rule, wherein the at least one logic rule defines a mapping condition with respect to an attribute of at least one of the mandatory parameter and the optional parameter; a program code mapping the at least one keyword and the definition format with a set of predefined keywords and a pre-defined definition format by using the at least one logic rule in order to obtain at least one mapped keyword and at least one mapped definition format; and a program code generating a desired syntax in a desired format by using the at least one mapped keyword and the at least one mapped definition format, thereby facilitating conversion of the format of the jobs.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

While aspects of described system and method for converting format of jobs associated with a job stream may be implemented in any number of different computing systems, environments, and/or configurations, the embodiments are described in the context of the following exemplary system.

The present disclosure describes system(s) and method(s) for converting job format of jobs associated with a software job stream in a computing environment. A file in original format is received. The file comprises syntax. The syntax defines the jobs and schedules in the original format. One or more keywords associated with the jobs and schedules are identified along with a definition format of the jobs and schedules. At least one of a mandatory parameter or an optional parameter associated with the jobs in original format is checked to apply one or more logic rules. The one or more logic rules define a mapping condition with respect to an attribute of the mandatory parameter and the optional parameter. Map the one or more keywords and the definition format with a set of predefined keywords and predefined definition format to obtain one or more mapped keywords and mapped definition format. A desired syntax in a desired format is generated by using the mapped keywords and the mapped definition format thereby facilitating conversion of the jobs format.

Figure 1:
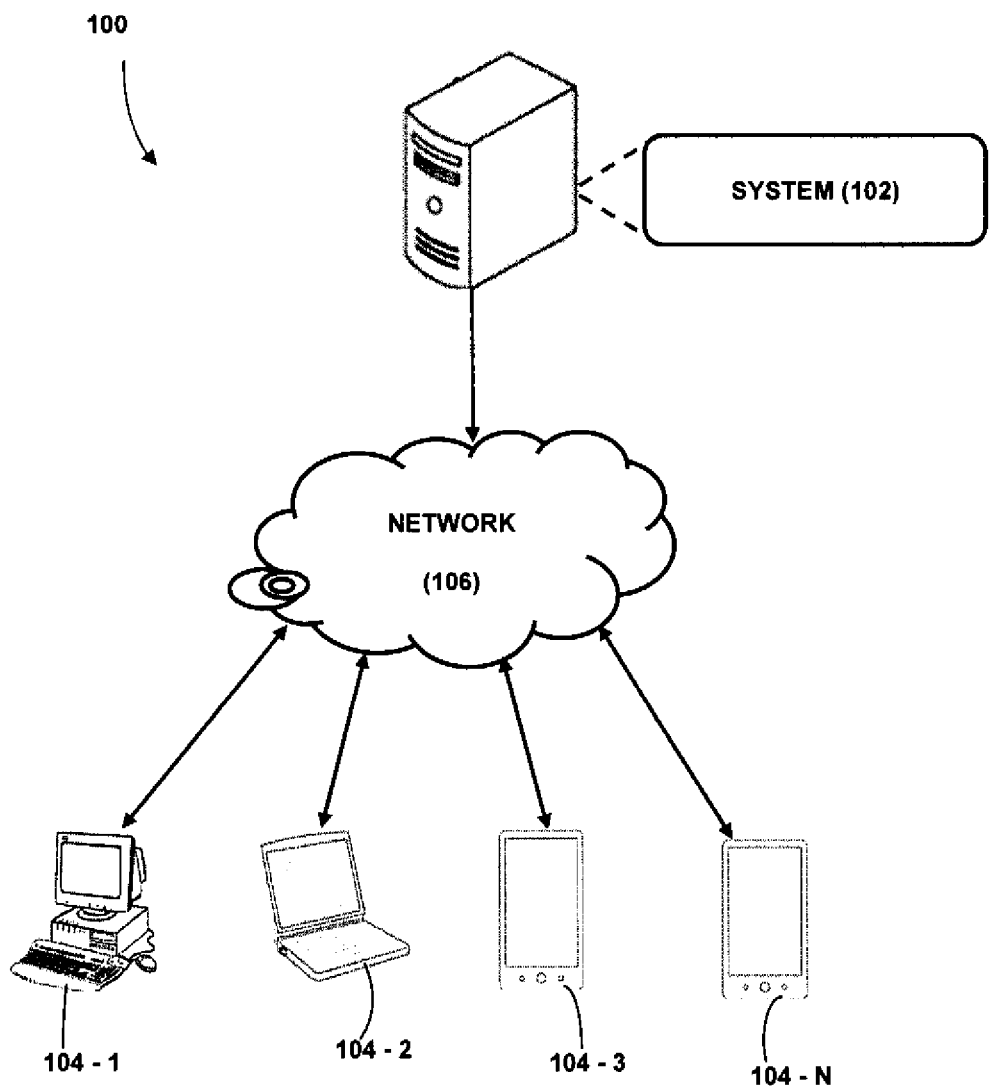
FIG. 1 illustrates a network implementation of a system for converting format of jobs associated with a software job stream is shown, in accordance with an embodiment of the present subject matter.

Referring now to FIG. 1, a network implementation 100 of system 102 a file associated with a software job stream is received in one format. The file stores syntax defining the jobs and schedules in an original format. The syntax defining the jobs and schedules in the original format (TWS Maestro) is required to be converted into a desired format (Autosys). In order to convert the original format into the desired format, the system 102 identifies keywords associated with the jobs and schedules along with a definition format (job definitions). After identification, the keywords and the definition format of the jobs (definition of jobs) are mapped to a set of pre-defined keywords and pre-defined definition format of the jobs to obtain a set of mapped keywords and mapped definition format of the jobs. The mapping is performed by way of one or more logic rules. The mapped keywords and mapped definition format are then used to convert the original format of the one or more jobs into the desired format. This is further to be understood by a person skilled in the art that the system and the method describes the conversion from Maestro to Autosys for which the intent is not to limit the scope of the disclosure and the methodology may be applied for any such similar format.

Although the present subject matter is explained considering that the system 102 is implemented as an application on a server, it may be understood that the system 102 may also be implemented in a variety of computing systems, such as a laptop computer, a desktop computer, a notebook, a workstation, a server, a network server, and the like. In one implementation, the system 102 may be implemented in a cloud-based environment. It will be understood that the system 102 may be accessed by multiple users through one or more user devices 104-1, 104-2 . . . 104-N, collectively referred to as user 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the interne, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
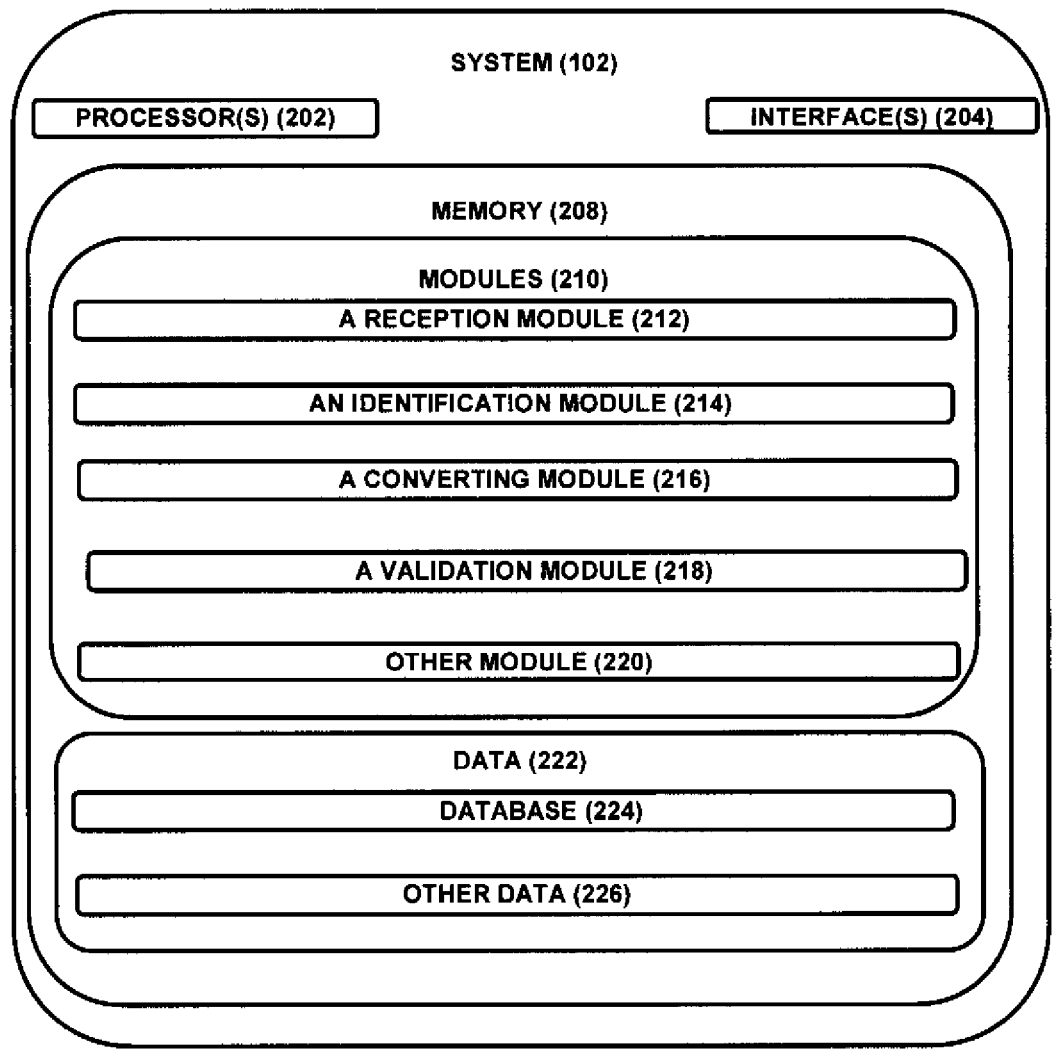
FIG. 2 illustrates the system for converting format of jobs associated with a software job stream, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 208. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 208.

The I/O interface 204 may include a variety of software and hardware interfaces, for example, a web interface, a graphical user interface, and the like. The I/O interface 204 may allow the system 102 to interact with a user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 208 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 208 may include modules 210 and data 212.

The modules 210 include routines, programs, objects, components, data structures, etc., which perform particular tasks, functions or implement particular abstract data types. In one implementation, the modules 210 may include a receiving module 212, an identification module 214, a converting module 216, and a validation module 218. Other modules 220 may include programs or coded instructions that supplement applications and functions of the system 102.

The data 222, amongst other things, serves as a repository for storing data processed, received, and generated by one or more of the modules 220. The data 222 may also include a database 224, and other data 226. The other data 226 may include data generated as a result of the execution of one or more modules in the other module 220.

The present disclosure relates to system(s) and method(s) for converting original format of jobs and schedules into a desired format. The jobs are associated with a software job stream. The original format may include jobs and schedules defined in a Maestro format and the desired format may include jobs and schedules defined in an Autosys format. The Autosys format is a structured format. The structured format comprises a JIL (Job Interface Language).

The receiving module 212 is configured to receive a file associated with the software job stream (or simply job stream). The file defines syntax of the jobs and schedules in the Maestro format (also called as original format). The file comprises ASCII text file containing Maestro Schedule and job as command line argument. The Maestro has an unstructured format of representing the scheduling data (jobs).

The identification module 214 is configured to use Convert.ksh (a korn shell script) that acts as a wrapper for the main PERL script and is used for reading the Maestro schedule and job definition (i.e. definition format of jobs). The identification module 214 identifies important keywords and definition formats (or formats) of the jobs and schedules in Maestro. The identification module 214 parses syntax and the definition format of the jobs and schedules in Maestro format. The identification module 214 extracts a name of the Sched/job (job name) in the original format. The job name is then used as an argument for defining one or more keywords and schedules.

The converting module 216 is configured to use Jilconversion.pl (Perl script) to map the Maestro syntactical terms (keywords) with a predefined set of keywords. The predefined set of keywords comprises equivalent keywords in Autosys format. The mapping of keywords of Maestro with that of equivalent keywords of Autosys provides mapped keywords. The definition format of jobs or job definitions (in Maestro) is also mapped to a pre-defined definition format of jobs to obtain a mapped definition format of jobs. The mapped definition format comprises an Autosys definition format where the jobs are defined in Autosys.

The converting module 216 uses logic rules while mapping the keywords in the Maestro format to equivalent keywords in the Autosys format. The converting module 216 checks at least one of a mandatory parameter or an optional parameter (Mandatory: Workstation Name, RECOVERY TYPE, TIMEZONE etc; Optional: AT, UNTIL, FOLLOWS, NEEDS, etc.) associated with the keywords of the job and schedule in the original format to apply one or more logic rules. The logic rules define a mapping condition with respect to an attribute of the mandatory parameter and the optional parameter. The mandatory parameters associated with keywords defining the Maestro and Autosys schedule are different but the values for the mandatory parameters (keywords) remain same.

By way of an non limiting example:
Maestro: SCHEDULE: this_my_job_name_as_value
Autosys: INSERT_JOB: this_my_job_name_as_value
In the above example, SCHEDULE is a mandatory parameter in the keyword in Maestro and INSER_JOB is the mandatory parameter in the keyword in Autosys. But value of the keywords SCHEDULE Maestro and INSERT_JOB in Autosys is same i.e. this is my job name as values.

The details of converting module 216 and algorithm used for mapping keywords and definition format of jobs are described below:

Steps 1 to 3.3 Refer to Maestro Script that Collects Required Information for Each Job.

Step 1: Check for cmd line Parameter Passed. The mandatory parameters are: <file containing maestro to schedule definition>, <file containing Maestro job definition>

Step 2: process the file containing the Schedule definition to obtain the list of Job Names used in Maestro Schedule.

Step 3: For each of the jobs in the list obtained, have a flag for job name identification and initialize its value to 0. Read each line of the file containing the job definition.

Step 3.1: If the line does not match with the current job name, then read the next line of the job file.

Step 3.2: If does not contain any of the following words: RECOVERY STOP, RECOVERY CONTINUE, RECOVERY RETURN, RECOVERY AFTER, then set the job name identification flag=1.

Step 3.2.1: If the line matches with the job name, or the keywords: SCRIPTNAME, DOCOMMAND, DESCRIPTION, and STREAMLOGON, then print these details in a single line into the job attributes files.

Step 3.3: The above steps are repeated for all the job names obtained. Thus a job attribute file is obtained with the job names and their respective attributes listed.

Step 4: the script: jilconversion_newnew.pl is onvoked. The mandatory parameters are passed to it are: SCHED file, job attribute file and output JIL file name. This is handled within the convert.ksh in the conversion module.

Steps 4.1 to 4.1.1 Refer to Collect the Required Information from the Maestro Schedule Definition.

Step 4.1: Read each line of the sched file till end of the line (Referring to table 1).

TABLE 1

| Maestro keyword | Action by script |
|---|---|
| OPENS | Flag set to indicate Autosys Box requires File watcher Job |
| SCHEDULE | BOX name: Placed in an array of job names |
| NEEDS | Job_load; pushed into array as <lastjob_name>; <job_load_value> |
| EXCEPT | If the line does not contain any of the days of the week (su, mo, tu, we, th, fr, sa), and only one calendar name, then assign the value to exclude_calender attribute |
| AT | Array of start_times; values <lastjob_name><line containing AT keyword> |
| UNTIL | Array of end_time value; values <lastjob_name><line containing UNTIL keyword> |
| ON | If line contains BYDAY keyword, assign values to "days_of_week" attribute. Else if only one calendar name is mentioned assign the values to "calendar" attribute |
| FOLLOWS | Array of conditions along with latest job name; |
| END | Indicates the end of the Schedule and hence the Autosys Box |
| # (without the above keywords in the same line) | Job_name; pushed into array of job names |

Step 4.1.1: Each Maestro keyword is mapped to its equivalent Autosys keyword.

Step 4.2: Traverse each line of the job attributes file and collect information on command, description, owner and recovery for each of the jobs.

Step 4.3: Traverse through each value of the conditions array created in step 4.1.1 and print job name |condition 1|condition 2|condition 3| . . . | condition into a conditions file. Get the job names having conditions in a separate array.

Step 4.4: For each job having conditions, create an array with the keys as the job name and the values as the success conditions.

Step 4.5: Repeat steps 4.3 and 4.4 for the start_times array to obtain an array with the keys as the job name and the values as the start times.

Step 4.6: Traverse through each job name in the array of job names created in step 4.1.1 and print its attributes and values to the output file.

Steps 4.6.1 to Step 4.6.8 Refer to Print a Final JIL Based on all the Information Collected in Previous Sections Step 4.6.1: Print the attribute insert_job: with values as current Job name Step 4.6.2: If the particular job name is the first value of the Job names array, then the job_type is a Box Step 4.6.2.1: If exists: Print the attribute exclude_calender with its values obtained from step 4.1.1.

Step 4.6.2.2: If exists, Print the attribute calendar with its values obtained from step 4.1.1.

Step 4.6.2.3: If exists, Print the attribute end_times with its values obtained from step 4.1.1.

Step 4.6.2.4: If at least any one of the above attributes exist, then print the date_type is a command_job Step 4.6.3.1: Print the command attribute with its values obtained from step 4.2

Step 4.6.3.2: The Maestro Workstation and equivalent Autosys server name are mentioned in server.cfg file. Print the value for machine obtained from this config file.

Step 4.6.4: Print the job_load attribute with its values obtained from step 4.1.1.

Step 4.6.5: If exists, Print the attribute start_times, end_time with its values obtained from step 4.1.1.

Step 4.6.5: If exists a value for the recovery attribute, and if the value is "rerun" then print the attribute n_entry with value 1. The recovery values for a particular job are obtained from step 4.2

Step 4.6.5: print the attribute owner with its value obtained from step 4.2

Step 4.6.6: print the attributes: std_out_file, std_err_file, permission and timezone with their required values.

Step 4.6.7: Print the attribute condition, in the required format, with the values obtained from step 4.3

Step 4.6.8: Print the attribute Priority with the required values as below:

TABLE 2

| Maestro | Autosys |
|---------|---------|
| GO      | 101     |
| HI      | 100     |

Else with the value obtained in step 4.1.1.

The software job stream consists of a sequence of jobs to be run, together with times, priorities, and other dependencies that determine the order of processing. A job stream begins with a SCHEDULE keyword followed by attributes and dependencies. The colon delimiter introduces the jobs invoked by the job stream. Each job has its own attributes and dependencies.

By way of a non-limiting examples, below is an example of the job stream:

```
[timezone|tz tzname]
        [description "text"]
        [on [runcycle name]
            [({at time
            [until time
            [except [runcycle name]
            [{at time ]
            [until time ]
        [follows { workstation#]jobstreamname[.jobname |@]
            [needs { [n] [workstation#]resourcename } [,...] ] [...]
            [opens { [workstation#]"filename"
            [priority number |hi| go]
            :
    Job-statement
    # comment
    [{at time}
    [until time}
    [every rate}
    [follows {[workstation # ] jobstreamname {.jobname @}]
    [needs { [n] [workstation#] resourcename} [,...] ] [...]
    [opens { [workstation#] "filename"
    [priority number |hi| go]
```

Table 3 provides a brief description of the exemplary job stream definition keywords. Table 1 also provides detailed description of each scheduling keyword.

TABLE 3

| Keyword | Description |
|---------|-------------|
| At | Defines the earliest time a job stream or a job run can be launched. When defined in a run cycle specifies the earliest time a job or a job stream can be launched for that specific run cycle. |
| Carryforward | Carries the job stream forward if it is not completed. |
| Comment | Includes comments in the definition of a job stream or in a job contained in the job stream. |
| Description | Contains a description of the job stream. The maximum length of this field is 120 characters. |
| End | Marks the end of a job stream. |
| Every | Launches the job repeatedly at a specified rate. |
| Except | Specifies dates that are exceptions to the on dates the job stream is selected to run. |
| Follows | Specifies jobs or job streams that must complete successfully before the job or the job stream that is being defined is launched. |
| job statement | Defines a job and its dependencies. |
| Limit | Sets a limit on the number of jobs that can be launched concurrently from the job stream. |
| Needs | Defines the number of units of a resource required by the job or job stream before it can be launched. The highest number of resources the job stream can be dependent from is 1024. |
| On | Defines the dates on which the job stream is selected to run. |
| Opens | Defines files that must be accessible before the job or job stream is launched. |
| Priority | Defines the priority for a job or job stream. |
| Runcycle | Specifies a label with a friendly name for the run cycle |
| Schedule | Assigns a name to the job stream. |
| timezone | tz | Specifies the time zone to be used when computing the start time. |
| Until | Defines a latest time a job or a job stream can be launched. When defined in a run cycle specifies the latest time a job or a job stream can be launched for that specific run cycle. |

Figure 4:
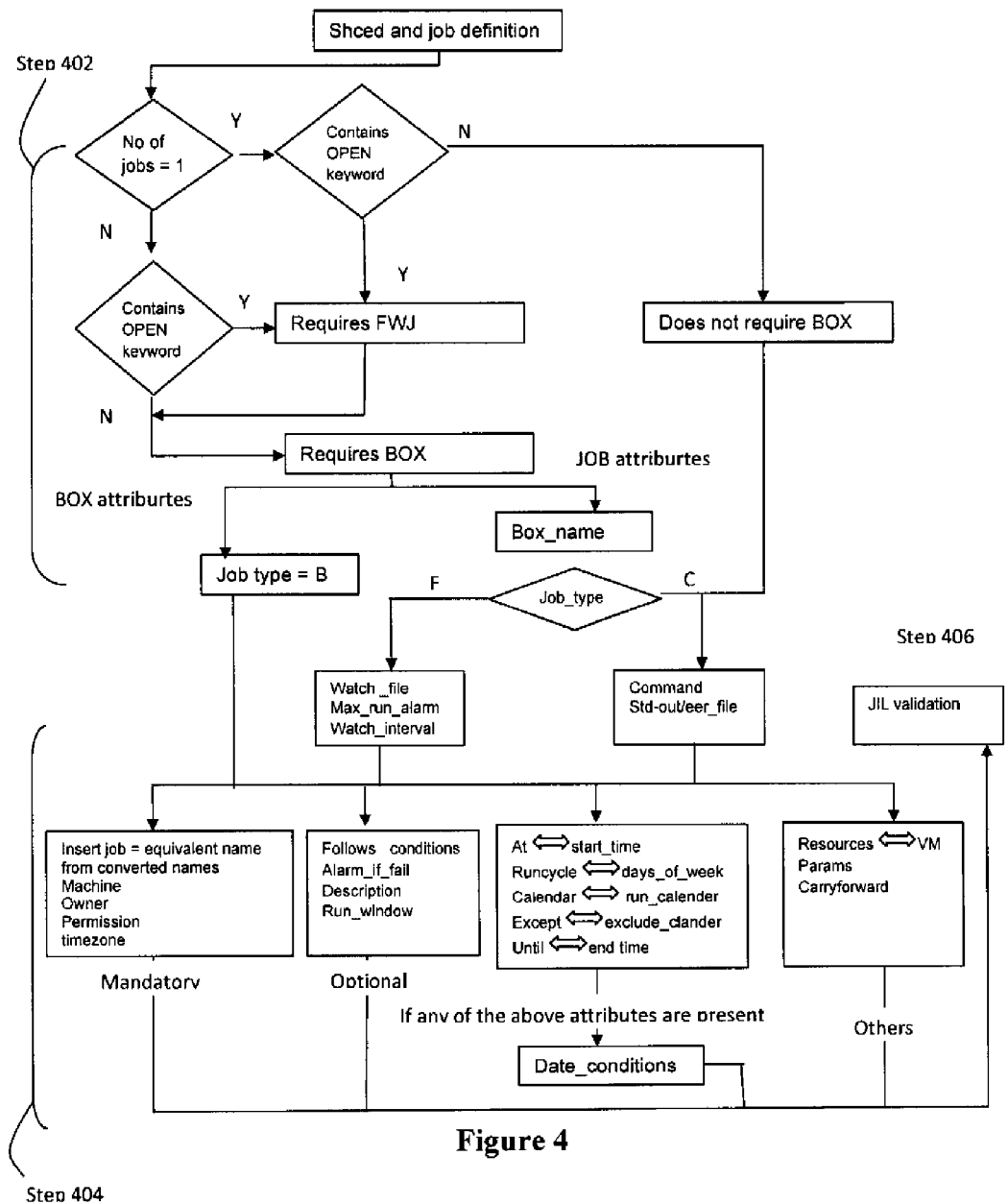
FIG. 4 illustrates a flow chart for converting format of jobs associated with a software job stream in accordance with an exemplary embodiment of the present subject matter.

Referring to FIG. 4, by way of a non limiting example, the receiving module 212 receives schedule and job definition in Maestro. Referring to step 202, the identification module 214 identifies the keyword and job definitions (definition format) associated with the syntax (defining the job and schedule) in Maestro. The identification module 214 identifies number of jobs and keywords defining the job(s) in Maestro. Let the number of job be 1 and keywords comprises OPEN. The converting module 216 checks if a BOX attribute is required or a JOB attribute is required. The converting module 216 line by line identifies one or more Job Interface Language (JIL) parameters (or simply parameters) associated with file and command of the job. According to step 404, the JIL parameters may comprise mandatory parameter, optional parameter, other parameter or a combination thereof. The mandatory parameter may comprise at least one of a job name, job type, Inser_job, Job_type, machine, owner, permission, timezone or a combination thereof. The optional parameter may comprise calendar, date, time etc. The optional parameters further comprise BOX_NAME, COMMAND, WATCH_FILE, STD_OUT_FILE, STD_ERR_FILE, DESCRIPTION, DATE_CONDITIONS, MAX_RUN_ALARM, ALARM_IF_FAIL, or a combination thereof based on the type of job. The other parameters may comprise n_retry, jobload, etc The conversion module 216 maps the keywords of the Maestro (original format) with a predefined set of keywords to obtain a mapped set of keywords. The predefined set of keywords comprises equivalent keywords of Maestro into Autosys. The mapped set of keywords refers to keywords in converted from Maestro into Autosys. The mapping is performed based on logic rules. The logic rules are configured to define a mapping condition with respect to each of the mandatory and optional parameters.

Still referring to FIG. 4, according to step 406, after obtaining the syntax in the desired format based on mapping, the validation of syntax in the desired format occurs.

Table 4 provides conditions associated with the optional JIL parameters:

TABLE 4

| Attributes (optional JIL parameters) | Condition |
| --- | --- |
| BOX_NAME | If a CMD/FW job fits in a BOX job |
| COMMAND | If it's a CMD job |
| WATCH_FILE | If it's a FW job |
| STD_OUT_FILE | If it's a CMD job |
| STD_ERR_FILE | If it's a CMD job |
| DESCRIPTION | Applicable to all jobs |
| DATE_CONDITIONS | Applicable to jobs with start_time, end_time, run_calender, days_of_week, exclude calendar defined |
| MAX_RUN_ALARM | If it's a FW job |
| ALARM_IF_FATL | Applicable to all jobs |

Table 5 describes Maestro-Autosys equivalent keywords obtained after mapping.

TABLE 5

| Maestro (original format) | Autosys (desired format) |
| --- | --- |
| AT | START_TIME |
| RUN CALENDER | CALENDER |
| RUN CYCLE | DAYS OF WEEK |
| FOLLOWS | CONDITIONS |
| UNTIL | END_TIME |
| EXCEPT | EXCLUDE |

The converting module 216 is configured to use the mapped keywords (obtained in the Autosys format) and mapped definition format to generate a desired syntax in the desired format. The conversion of syntax into the desired format results in the conversion of job from Maestro to Autosys.

The validation module 218 is configured to review the syntax in the desired format i.e. the syntax in the Autosys format. The validation module 218 is configured to report one or more error messages associated with the syntax in the desired format. The error messages refer to unmapped keywords and unmapped definition formats while the syntax in the desired format is getting generated. The error messages are used to validate the jobs in Maestro format converted into the Autosys. The error messages provides information about keywords for which mapping is not possible because of the presence of the unmapped keywords.

The output of validation module 218 is configured to review the syntax in the desired format by using normal unix utilities (commands). The normal unix utilities (commands) comprises at least one of a vi, a cat, a more (commands), or a combination thereof.

The unmapped keywords and definitions formats are related to features. The features comprises at least one of creation of File watcher jobs based on OPENS in Maestro format, resource limits, calendar run cycles, fencing, or a combination thereof.

By way of a non limiting examples, below is described a Maestro sched definition with keywords and values to the keywords as underlined:

```
SCHEDULE WRKSTNX#SYSTEM_JOB_ABC
ON RUNCYCLE RULE1
"FREQ=WEEKLY;BYDAY=MO,TU,WE,TH,FR,SA"
EXCEPT RUNCYCLE CALENDAR US_HOL
CARRYFORWARD
OPENS WRKSTNX#"^FILEPATH^filename.txt"
:
WRKSTNX#SYSTEM_JOB_ABC_STEP1
NEEDS 1 WRKSTNX#UNIX_LIMIT
WRKSTNX#SYSTEM_JOB_ABC_STEP2
NEEDS 1 WRKSTNX#PERL_LIMIT
FOLLOWS SYSTEM_JOB_ABC_STEP1
WRKSTNX#SYSTEM_JOB_ABC_STEP3
NEEDS 1 WRKSTNX#RES_LIMIT
FOLLOWS SYSTEM_JOB_ABC_STEP2
FOLLOWS WRKSTNX#SYSTEM_JOB_PQR_STEP2
END
MAESTRO JOB DEFINTION:
WRKSTNX#SYSTEM_JOB_ABC_STEP1
SCRIPTNAME " SRIPTLOCATION^myjavaprogram.jar <any commandline arguments here>"
STREAMLOGON "^SYSTEMLOGIN^"
DESCRIPTION "This job executes the java program"
TASKTYPE UNIX
RECOVERY STOP
WRKSTNX#SYSTEM_JOB_ABC_STEP2
SCRIPTNAME " SRIPTLOCATION^myCprogram.C <any commandline arguments here>"
STREAMLOGON "^SYSTEMLOGIN^"
DESCRIPTION "This job executes the C program"
TASKTYPE UNIX
RECOVERY STOP
WRKSTNX#SYSTEM_JOB_ABC_STEP3
SCRIPTNAME " SRIPTLOCATION^mypythonscript <any commandline arguments here>"
STREAMLOGON "^SYSTEMLOGIN^"
DESCRIPTION "This job executes the pyhton program"
TASKTYPE UNIX
RECOVERY STOP
```

The underlined keywords and format in Maestro are identified by the identification module 214 and are used while mapping with the keywords in Autosys by the converting module 216.

The Autosys definition for the above mentioned Maestro Sched definition and Maestro job definition is described below:

```
/*------------------SYSTEM_JOB_ABC-------------------*/
insert_job: SYSTEM_JOB_ABC
job_type: b
exclude_calendar: US_HOL
days_of_week: MO, TU, WE, TH, FR,SA
date_conditions: 1
owner: $SYSTEMLOGIN
permission: gx,wx
timezone: easterntime
/*------------------SYSTEM_JOB_ABC_STEP1-------------------*/
insert_job: SYSTEM_JOB_ABC_STEP1
job_type: c
box_name: SYSTEM_JOB_ABC
command: $SCRIPTLOCATION/myjavaprogram.jar <any
commandline arguments here>
machine: serverx.domain.com
owner: $SYSTEMLOGIN
description: "This job executes the java program"
std_out_file: ${LOG}/SYSTEM_JOB_ABC_STEP1.${PID}.log
std_err_file: ${ERROR}/SYSTEM_JOB_ABC_STEP1.${PID}.err
permission: gx,wx
timezone: easterntime
/*------------------SYSTEM_JOB_ABC_STEP2-------------------*/
insert_job: SYSTEM_JOB_ABC_STEP2
job_type: c
box_name: SYSTEM_JOB_ABC
command: $SCRIPTLOCATION/myCprogram.C <any
commandline arguments here>
machine: serverx.domain.com
owner: $SYSTEMLOGIN
conditions: s(SYSTEM_JOB_ABC_STEP1)
description: "This job executes the C program"
std_out_file: ${LOG}/SYSTEM_JOB_ABC_STEP2.${PID}.log
std_err_file: ${ERROR}/SYSTEM_JOB_ABC_STEP2.${PID}.err
permission: gx,wx
timezone: easterntime
/*------------------SYSTEM_JOB_ABC_STEP3-------------------*/
insert_job: SYSTEM_JOB_ABC_STEP3
job_type: c
box_name: SYSTEM_JOB_ABC
command: $SCRIPTLOCATION/mypythonscript <any
commandline arguments here>
machine: serverx.domain.com
owner: $SYSTEMLOGIN
conditions: s(SYSTEM_JOB_ABC_STEP2) AND
s(SYSTEM_JOB_PQR_STEP2)
description: "This job executes the Python program"
std_out_file: ${LOG}/SYSTEM_JOB_ABC_STEP3.S${PID}.log
std_err_file: ${ERROR}/SYSTEM_JOB_ABC_STEP3.${PID}.err
permission: gx,wx
timezone: easterntime
```

The underlined keywords and format in Autosys are mapped with the keywords and format in the Maestro in order to convert the Maestro job into the Autosys. The underlined keywords in Maestro are SCHEDULE, FOLLOWS, RECOVERY TYPE, SCRIPT NAME, AT etc and the underlined keywords in Autosys are INSERT_JOB:, DAYS_OF_WEEK:, RUN_CALENDER, START_TIMES, etc.

By way of another non limiting example, the Maestro sched definition and Maestro job definition with keywords and values to the keywords as underlined are explained below:

```
SCHEDULE WRKSTNX#ETLSYSTEM_BATCH_ABC
ON CALENDAR MONTHEND
EXCEPT RUNCYCLE CALENDAR US_HOL
AT 1430
UNTIL 1830
DESCRIPTION "SAMPLE SCHEDULE FOR CONVERSION"
PRIORITY 1
CARRYFORWARD
OPENS WRKSTNX#"^FILEPATH^tsewod00.con.eu.dy.bcard"
:
WRKSTNX#ETLSYSTEM_BATCH_ABC_JOBX
NEEDS 1 WRKSTNX#ETL_LIMIT
```

```
PRIORITY HI
AT 1630
UNTIL 2230
WRKSTNX#ETLSYSTEM_BATCH_ABC_JOBY
NEEDS 1 WRKSTNX#ETL_LIMIT
FOLLOWS ETLSYSTEM_BATCH_ABC_JOBX
WRKSTNX#ETLSYSTEM_BATCH_ABC_JOBZ
NEEDS 1 WRKSTNX#ETL_LIMIT
FOLLOWS SETLSYSTEM_BATCH_ABC_JOBY
END
MAESTRO JOB DEFINTION:
WRKSTNX#ETLSYSTEM_BATCH_ABC_JOBX
SCRIPTNAME " SCRIPTLOCATION^executing_etl_flow.sh <any
command line arguments here>"
STREAMLOGON "^SYSTEMLOGIN^"
DESCRIPTION "This job extracts data for the table
EMPLOYEE"
TASKTYPE UNIX
RECOVERY STOP
WRKSTNX#ETLSYSTEM BATCH ABC JOBY
DOCOMMAND "mv file_pattern* ^SCRIPTLOCATION^"
STREAMLOGON "^SYSTEMLOGIN^"
DESCRIPTION "This job moves files to script location path"
TASKTYPE UNIX
RECOVERY STOP
WRKSTNX#ETLSYSTEM_BATCH_ABC_JOBZ
SCRIPTNAME " SCRIPTLOCATION^loading_etl_flow.sh <any
command line arguments here>"
STREAMLOGON "^SYSTEMLOGIN^"
DESCRIPTION "This job loads data for table employee in
organization database"
TASKTYPE UNIX
RECOVERY RERUN
```

The underlined keywords of the Maestro are mapped to underlined keywords and format of Autosys as described below.

```
AUTOSYS JIL DEFINTION:
/*------------------ETLSYSTEM_BATCH_ABC-------------------*/
insert_job: ETLSYSTEM_BATCH_ABC
job_type: b
exclude_calendar: US_HOL
run_calendar: MONTHEND
date_conditions: 1
owner: $SYSTEMLOGIN
description: "SAMPLE SCHEDULE FOR CONVERSION"
start_times: 14:30
end_time: 18:30
priority: 1
permission: gx,wx
timezone: CentralTime
/*------------------ETLSYSTEM_BATCH_ABC_JOBX-----------------*/
insert_job: ETLSYSTEM BATCH ABC JOBX
job_type: c
box_name: ETLSYSTEM_BATCH_ABC
command: $SCRIPTLOCATION/executing_etl_flow.sh <any
command line arguments here>
start_times: 16:30
date_conditions: 1
end_time: 22:30
machine: serverx.domain.com
owner: $SYSTEMLOGIN
description: "This job extracts data for the table EMPLOYEE"
std_out_file:
${LOG}/ETLSYSTEM_BATCH_ABC_JOBX.${PID}.log
std_err_file:
${ERROR}/ETLSYSTEM_BATCH_ABC_JOBX.${PID}.err
priority: 100
permission: gx,wx
timezone: CentralTime
/*----------------ETLSYSTEM_BATCH_ABC_JOBY-----------------*/
insert_job: ETLSYSTEM_BATCH_ABC_JOBY
job_type: c
box_name: ETLSYSTEM_BATCH_ABC
command: mv file_pattern* $SCRIPTLOCATION
```

-continued

```
machine: serverx.domain.com
conditions: s(ETLSYSTEM_BATCH_ABC_JOBX)
owner: $SYSTEMLOGIN
description: "This job moves files to script location path"
std_out_file:
${LOG}/ETLSYSTEM_BATCH_ABC_JOBY.${PID}.log
std_err_file:
${ERROR}/ETLSYSTEM_BATCH_ABC_JOBY.${PID}.err
permission: gx,wx
timezone: CentralTime
/*----------------ETLSYSTEM_BATCH_ABC_JOBZ-----------------*/
insert_job: ETLSYSTEM_BATCH_ABC_JOBY
job_type: c
box_name: ETLSYSTEM_BATCH_ABC
command: $SCRIPTLOCATION/loading_etl_flow.sh <any
command line arguments here>
machine: serverx.domain.com
conditions: s(ETLSYSTEM_BATCH_ABC_JOBY)
owner: $SYSTEMLOGIN
n_retry: 1
description: "This job loads data for table employee in organization
database"
std_out_file:
${LOG}/ETLSYSTEM_BATCH_ABC_JOBZ.${PID}.log
std_err_file:
${ERROR}/ETLSYSTEM_BATCH_ABC_JOBZ.${PID}.err
permission: gx,wx
timezone: CentralTime
```

Figure 3:
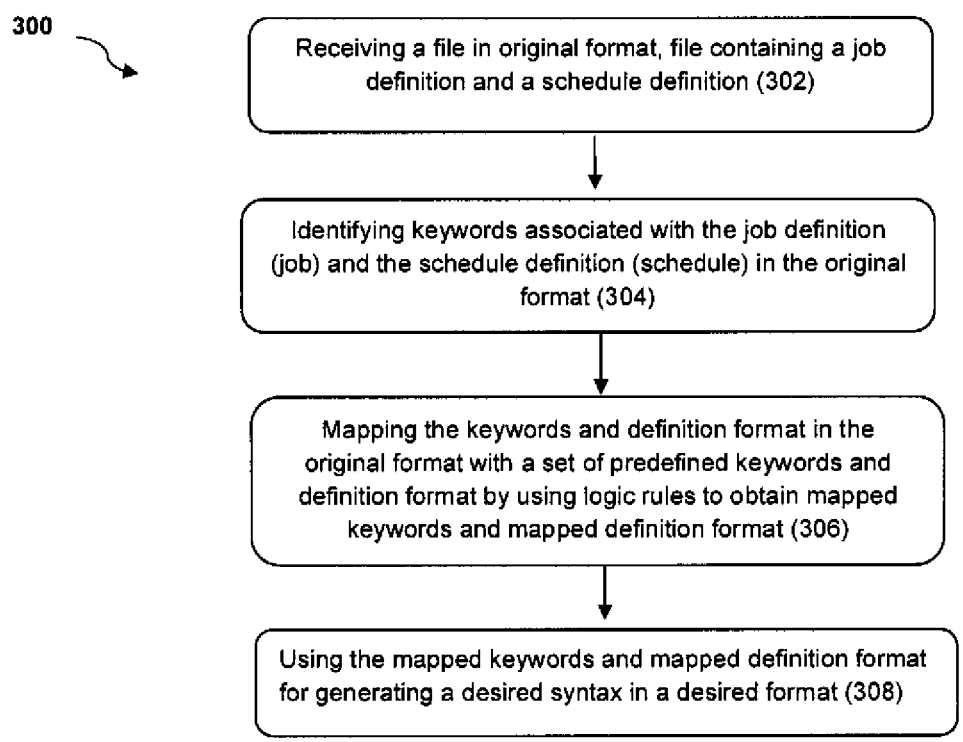
FIG. 3 illustrates a method for converting format of jobs associated with a software job stream, in accordance with an embodiment of the present subject matter.

Referring to FIG. 3, the order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method can be implemented in any suitable hardware, software, firmware, or combination thereof. However, for ease of explanation, in the embodiments described below, the method 300 may be considered to be implemented in the above described system 102.

At block 302, a file in an original format is received, the file is contains at least one syntax defining a job and a schedule or provides a job definition and a schedule definition.

At block 304, keywords associated with the job and schedules are identified.

At block 306, keywords of the job and schedules in the original format are mapped with a set of predefined keywords and format by using the logic rules in order to obtain mapped keywords.

Syntax in a desired format is obtained by using the mapped keywords and mapped format thereby converting the original format of job and schedule into a desired format.

The written description describes the subject matter herein to enable any person skilled in the art to make and use the embodiments of the disclosure. The scope of the subject matter embodiments are defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

We claim:

1. A system for converting a format of jobs associated with a software job stream, the system comprising:
   a processor; and
   a memory coupled to the processor, wherein the processor is capable of executing a plurality of modules stored in the memory, and wherein the plurality of modules comprise:
   a receiving module configured to receive a file in an original format, wherein the file is associated with the software job stream, wherein the file comprises at least one syntax defining the jobs and a plurality of schedules;
   an identification module configured to identify at least one keyword associated with the jobs and the plurality of schedules along with a definition format of the jobs and the plurality of schedules; and
   a converting module configured to:
      check at least one of a mandatory parameter and an optional parameter associated with the at least one keyword of the original format to apply at least one logic rule, wherein the at least one logic rule defines a mapping condition with respect to an attribute of at least one of the mandatory parameter and the optional parameter;
      map the at least one keyword and the definition format with a set of predefined keywords and a pre-defined definition format by using the at least one logic rule in order to obtain at least one mapped keyword and at least one mapped definition format; and
      generate a desired syntax in a desired format by using the at least one mapped keyword and the at least one mapped definition format, thereby facilitating conversion of the format of the jobs.

2. The system of claim 1, wherein the file comprises an American Standard Code for Information Interchange (ASCII) text file containing the plurality of schedules and the jobs in one format as command line argument.

3. The system of claim 1, wherein the original format comprises a Maestro format.

4. The system of claim 1, wherein the desired format comprises an Autosys format, and wherein the Autosys format is a structured format, and wherein the structured format comprises a Job Information Language (JIL).

5. The system of claim 1, wherein the identification module is configured to:
   extract a name of the job in the original format; and
   use the name of the job as an argument, wherein the argument is used for identifying the at least one keyword and the definition format associated with the at least one syntax in the original format.

6. The system of claim 1, wherein the receiving module is configured to read the file in the original format by using a wrapper script, wherein the wrapper script comprises a second file, wherein the second file comprises a convert.ksh script.

7. The system of claim 1, wherein the converting module is configured to map the at least one keyword and the format of the at least one syntax in the original format by using a Perl script.

8. The system of claim 1, wherein the set of predefined keywords and the definition format comprises equivalent keywords and definition formats in an Autosys format.

9. The system of claim 1, further comprises a validation module configured to:
   review the at least one syntax in the desired format; and
   report at least one error message associated with the syntax in the desired format, wherein the error message refers to at least one unmapped keyword and the definition format while the syntax in the desired format is being generated, wherein the at least one error message is used for validation of the syntax in the desired format.

10. The system of claim 9, wherein an output of the validation module is seen by using at least one normal unix utility, wherein the at least one normal unix utility further comprise at least one of: a vi, a cat, and a more.

11. The system of claim 9, wherein the at least one unmapped keyword and the definition format are related to features, wherein the features comprise creation of File watcher jobs based on at least one of OPENS in Maestro format, resource limits, calendar run cycles, and fencing.

12. A method for converting a format of jobs associated with a software job stream, the method comprising:
receiving, by a processor, a file in an original format, wherein the file is associated with the software job stream, wherein the file comprises at least one syntax defining the jobs and a plurality of schedules;
identifying, by the processor, at least one keyword associated to the jobs and the plurality of schedules along with a definition format of the jobs and the plurality of schedules;
checking, by the processor, at least one of a mandatory parameter and an optional parameter associated with the at least one keyword of the original format to apply at least one logic rule, wherein the at least one logic rule defines a mapping condition with respect to an attribute of at least one of the mandatory parameter and the optional parameter;
mapping, by the processor, the at least one keyword and the definition format with a set of predefined keywords and a pre-defined definition format by using the at least one logic rule in order to obtain at least one mapped keyword and at least one mapped definition format; and
generating, by the processor, a desired syntax in a desired format by using the at least one mapped keyword and the at least one mapped definition format, thereby facilitating conversion of the format of the jobs.

13. The method of claim 12, wherein identifying the at least one keyword comprises:
extracting a name of the job in original format; and
using the name of the job as an argument, wherein the argument is used for identifying the at least one keyword and definition format associated with the at least one syntax in the original format.

14. The method of claim 12, wherein receiving the file comprises reading the file in the original format by using a wrapper script, wherein the wrapper script comprises a second file, wherein the second file comprises a convert.ksh script.

15. The method of claim 12, wherein mapping the at least one keyword and the definition format comprises mapping the at least one keyword and the definition format of the at least one syntax in original format using a Perl script.

16. The method of claim 12, wherein the set of predefined keywords and the definition format comprises equivalent keywords and definition formats in an Autosys format.

17. The method of claim 12, is further configured to:
review the at least one syntax in the desired format; and
report at least one error message associated with the syntax in the desired format, wherein the at least one error message refers to at least one unmapped keyword and the definition format while the syntax in the desired format is being generated, wherein the at least one error message is used for validation of the syntax in the desired format.

18. The method of claim 17, wherein the at least one unmapped keyword and the definition format are related to features, wherein the features comprise creation of File watcher jobs based on at least one of OPENS in Maestro format, resource limits, calendar run cycles, and fencing.

19. A non-transitory computer program product having embodied thereon a computer program executable in a computing device for changing a format of job definitions associated with a software job stream, the computer program product comprising:
a program code for receiving a file in an original format, wherein the file is associated with the software job stream, wherein the file comprises at least one syntax defining the jobs and a plurality of schedules;
a program code for identifying at least one keyword associated to the jobs and the plurality of schedules along with the definition format of the jobs and the plurality of schedules;
a program code checking at least one of a mandatory parameter and an optional parameter associated with the at least one keyword of the original format to apply at least one logic rule, wherein the at least one logic rule defines a mapping condition with respect to an attribute of at least one of the mandatory parameter and the optional parameter;
a program code mapping the at least one keyword and the definition format with a set of predefined keywords and a pre-defined definition format by using the at least one logic rule in order to obtain at least one mapped keyword and at least one mapped definition format; and
a program code generating a desired syntax in a desired format by using the at least one mapped keyword and the at least one mapped definition format, thereby facilitating conversion of the format of the jobs.

20. The computer program product of claim 19, wherein the program code for identifying the at least one keyword further comprises:
a program code for extracting a name of the job in original format; and
a program code for using the name of the job as an argument, wherein the argument is used for identifying the at least one keyword and definition format associated with the at least one syntax in the original format.

\* \* \* \* \*